US009576033B2

(12) United States Patent
Barrett et al.

(10) Patent No.: US 9,576,033 B2
(45) Date of Patent: Feb. 21, 2017

(54) SYSTEM, METHOD AND USER INTERFACE FOR CONTENT SEARCH

(75) Inventors: Timothy Allen Barrett, Pymble (AU); Ben Crosby, Murphy, TX (US)

(73) Assignee: THOMSON LICENSING, Issy les Moulineaux (FR)

( * ) Notice: Subject to any disclaimer, the term of this patent is extended or adjusted under 35 U.S.C. 154(b) by 68 days.

(21) Appl. No.: 13/809,046

(22) PCT Filed: Jul. 12, 2010

(86) PCT No.: PCT/US2010/038279
§ 371 (c)(1),
(2), (4) Date: Jan. 8, 2013

(87) PCT Pub. No.: WO2012/008940
PCT Pub. Date: Jan. 19, 2012

(65) Prior Publication Data
US 2013/0117260 A1  May 9, 2013

(51) Int. Cl.
*G06F 17/30* (2006.01)
(52) U.S. Cl.
CPC ... *G06F 17/30554* (2013.01); *G06F 17/30038* (2013.01); *G06F 17/30061* (2013.01); *G06F 17/30274* (2013.01)
(58) Field of Classification Search
CPC ............... G06F 17/30864; G06F 17/30867; G06F 17/30595
USPC ........................................................ 707/722
See application file for complete search history.

(56) References Cited

U.S. PATENT DOCUMENTS

| 6,473,751 B1 * | 10/2002 | Nikolovska et al. |
| 7,137,075 B2 | 11/2006 | Hoshino |
| 7,485,796 B2 * | 2/2009 | Myeong et al. ................ 84/609 |
| 7,570,261 B1 * | 8/2009 | Edecker et al. ............. 345/420 |
| 7,590,948 B2 | 9/2009 | Narita |
| 7,698,658 B2 | 4/2010 | Ohwa |

(Continued)

FOREIGN PATENT DOCUMENTS

| CN | 1723431 A | 1/2006 |
| JP | HEI05204987 | 8/1993 |

(Continued)

OTHER PUBLICATIONS

Search Report dated Mar. 16, 2011.

*Primary Examiner* — Tony Mahmoudi
*Assistant Examiner* — Dongming Wang
(74) *Attorney, Agent, or Firm* — Brian J. Dorini; Michael A. Pugel; Ivonete Markman

(57) ABSTRACT

A system and method for searching content and user interface for presenting results of the search are provided, wherein visual elements representing the content are distributed in three dimensions on a display, with the various axes representing criteria that relate to a central starting point of the search and the proximity to the central point indicating the degree of relevance. The outer bounds of the display contain a large amount of varied material of various types to allow a user to select content of a different type, with the content at the periphery of the display being essentially random and representing little or no link to the starting point of the search. Any displayed element may be selected, as a source for a next level search, in which case content relationships will be re-drawn, with the selected content used as the center point for a next level search.

42 Claims, 8 Drawing Sheets

(56) References Cited

U.S. PATENT DOCUMENTS

| | | |
|---|---|---|
| 7,735,018 B2 * | 6/2010 | Bakhash .................... 715/782 |
| 7,752,184 B2 * | 7/2010 | Kagawa .................... 707/702 |
| 7,917,865 B2 | 3/2011 | Saijo |
| 8,095,892 B2 | 1/2012 | Anthony et al. |
| 8,549,436 B1 * | 10/2013 | Capriati et al. ............. 715/838 |
| 2003/0126601 A1 * | 7/2003 | Roberts et al. ............. 725/37 |
| 2003/0144996 A1 | 7/2003 | Moore, Jr. |
| 2004/0030741 A1 * | 2/2004 | Wolton et al. ............. 709/202 |
| 2006/0058958 A1 * | 3/2006 | Galbreath et al. .......... 701/214 |
| 2006/0085395 A1 | 4/2006 | Cradick et al. |
| 2006/0155684 A1 | 7/2006 | Liu et al. |
| 2006/0236251 A1 * | 10/2006 | Kataoka ............. G06F 3/0481 |
| | | 715/757 |
| 2007/0192690 A1 | 8/2007 | Huthwaite |
| 2007/0220045 A1 | 9/2007 | Morris et al. |
| 2007/0239698 A1 | 10/2007 | Quinn-Jacobs |
| 2008/0086687 A1 | 4/2008 | Sakai et al. |
| 2008/0141329 A1 * | 6/2008 | Igoe ............................. 725/141 |
| 2008/0148176 A1 | 6/2008 | Mita |
| 2009/0089712 A1 | 4/2009 | Sato |
| 2010/0153372 A1 * | 6/2010 | Kim ................ G06F 17/30864 |
| | | 707/722 |
| 2012/0030214 A1 * | 2/2012 | Branca et al. ............. 707/743 |

FOREIGN PATENT DOCUMENTS

| | | |
|---|---|---|
| JP | 2000172247 | 6/2000 |
| JP | 2004178384 | 6/2004 |
| JP | 2004355286 | 12/2004 |
| JP | 2005267390 | 9/2005 |
| JP | 2007034663 | 2/2007 |
| JP | 2007122496 | 5/2007 |
| JP | 2010055426 | 3/2010 |
| KR | 20000012185 | 5/2001 |
| WO | WO0011540 | 3/2000 |
| WO | WO0173598 | 10/2001 |
| WO | WO0227508 | 4/2002 |

* cited by examiner

SYSTEM, METHOD AND USER INTERFACE FOR CONTENT SEARCH

This application claims the benefit, under 35 U.S.C. §365 of International Application PCT/US10/038279, filed Jul. 12, 2010, which was published in accordance with PCT Article 21(2) on Jan. 19, 2012 in English.

TECHNICAL FIELD OF THE INVENTION

The present disclosure generally relates to digital content systems and methods for searching through a large amount of media content efficiently and in a graphical way, and more particularly, to a system, method and graphic user interface for selecting a particular piece of content or content grouping from a large number of possibilities, then allowing the selected content to be played directly or the data associated with the selected content to be used as a key for a further search.

BACKGROUND OF THE INVENTION

Home entertainment systems, including television and media centers, are converging with the Internet and providing access to a large number of available sources of content, such as video, movies, TV programs, music, etc. This expansion in the number of available sources necessitates a new strategy for navigating a media interface associated with such systems and making content selections.

The large number of possible content sources creates an interface challenge that has not yet been successfully solved in the field of home media entertainment. This challenge involves successfully presenting users with a large number of elements (programs, sources, etc.) without the need to tediously navigate through multiple display pages or hierarchies of content.

Further, most existing search paradigms make an assumption that the user knows what they are looking for when they start, whereas often, a mechanism to allow a process of discovery and cross linkage is more desirable or appropriate.

The information bottleneck in conventional media guide interfaces is largely the result of the limits to user awareness. If users cannot see all of the possible choices at one time, or are forced to spend inordinate amounts of time and effort in order to gain awareness of the same, then it is likely that opportunities will be missed. In addition, the notion of a workable, largely graphical search paradigm remains elusive.

The present disclosure is directed towards overcoming these drawbacks.

SUMMARY

A system, method and user interface for content search are provided. The present disclosure is directed towards a system and method for searching content and a user interface for presenting results of the search in a visual form wherein visual elements representing the content are distributed in three dimensions on a screen or display, with the various axes representing criteria that relate to a starting or central point and the proximity to the central point indicates the degree of relevance to the search. The outer bounds of the display will contain a large amount of varied material of various types to allow a user to select content of a different type, with the content at the periphery of the display being essentially random and representing little or no link to the rest of the content surrounding it. In this way, the content displayed on the display will represent a full gamut of possible content that may be accessed by the user. Any displayed element may be selected, as a source for a next level search, in which case content relationships will be re-drawn, with the selected content used as the center point for a next level search.

According to one aspect of the present disclosure, a method for searching for content on an interactive graphic display in response to an input device is provided, the method including the steps of displaying a plurality of first visual elements in an array on the display, each first visual element corresponding to a selectable content source or category of content, selecting at least one of the first visual elements to perform a search of the selectable content source or category of content, and displaying results of the search as a plurality of second visual elements in three dimensional array on the display, each second visual element corresponding to a specific content or category of content, wherein at least one axis of the display represents search criteria relating to a central starting point of the three dimensional array and proximity of each of the second visual elements to the central starting point indicates a degree of relevance to the search.

According to another aspect of the present disclosure, a system for searching for content is provided. The system includes a display interface for displaying a plurality of first visual elements in an array on a display device, each first visual element corresponding to a selectable content source or category of content, a user interface for selecting, in response to input from an input device, at least one of the first visual elements, a controller for performing a search based on metadata associated with the content source or category of content of at least one first visual element, and the display interface for displaying results of the search as a plurality of second visual elements in three dimensional array on the display, each second visual element corresponding to a specific content, wherein at least one axis of the display represents search criteria relating to a central starting point of the three dimensional array and proximity of each of the second visual elements to the central starting point indicates a degree of relevance to the search.

In a further aspect, a graphic user interface for content search is provided including means for displaying a plurality of first visual elements in an array on a display, each first visual element corresponding to a selectable content source or category of content, means for selecting at least one of the first visual elements to perform a search of the selectable content source or category of content, and means for displaying results of the search as a plurality of second visual elements in three dimensional array on the display, each second visual element corresponding to a specific content, wherein at least one axis of the display represents search criteria relating to a central starting point of the three dimensional array and proximity of each of the second visual elements to the central starting point indicates a degree of relevance to the search.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
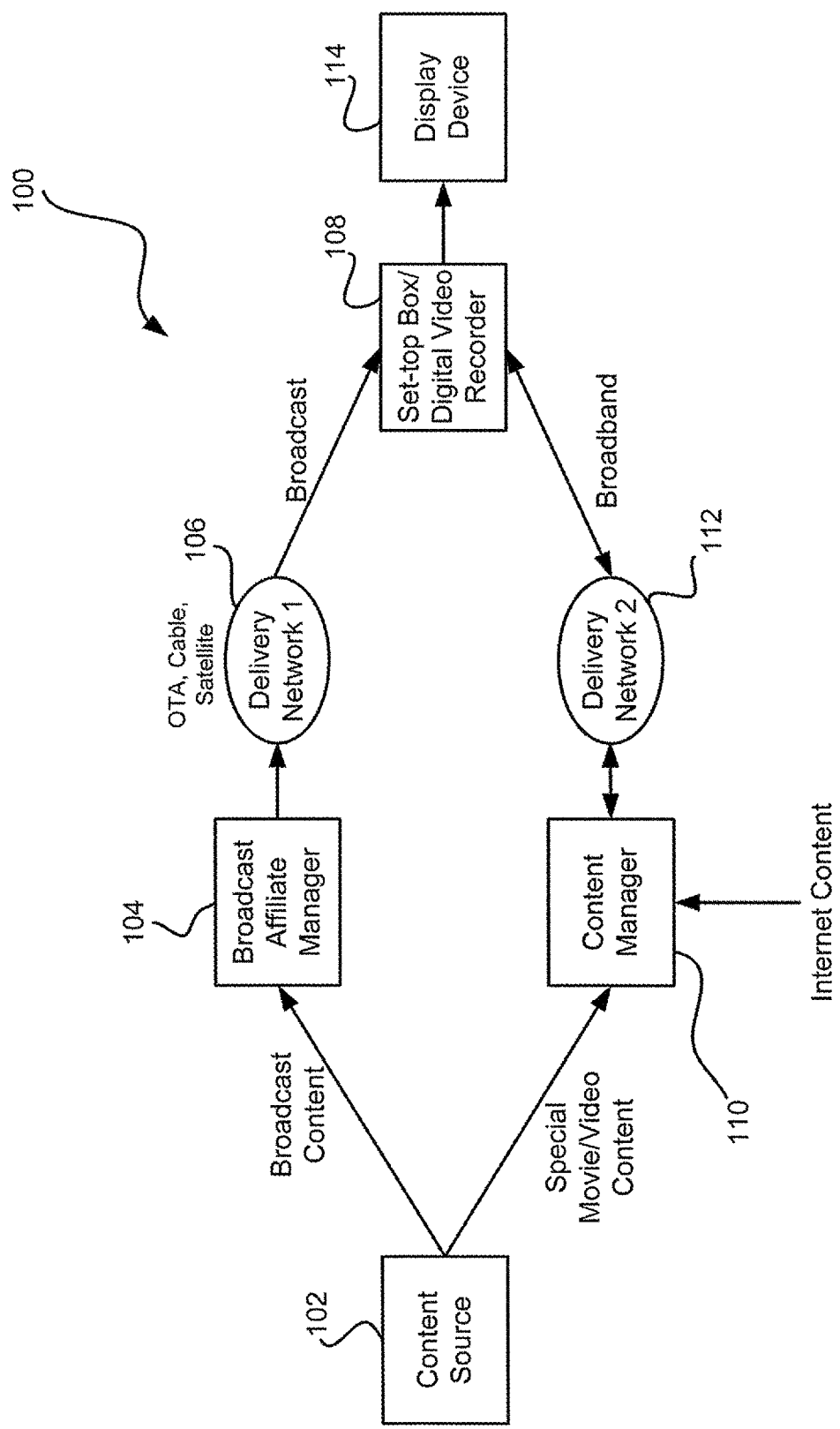
FIG. 1 is a block diagram of an exemplary system for delivering video content in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure provides a system and method for searching content and a graphical user display interface for organizing and presenting content to a user in such a way as to enable an open graphical search, providing the user access to the content, e.g., a program or title, the user is searching for within a matter of a few clicks or gestures. Information or content is represented or organized in a three-dimensional array of graphical visual elements. These elements (e.g., icons, thumbnails, items or the like) represent both the content itself or categories of content, and an array of data associated with the content. From a user's perspective, for example, poster art may represent a particular movie, though that same visual element, if used as a key for a search, provides a rich set of data upon which to search and determine associations (e.g., actors, genre, popularity, directors, etc. . . . ).

Elements, representing the content, are visually differentiated via position on a screen of a display, size and apparent "depth". Elements in the center of the screen represent the current key focus to the user and the element in the center will be the largest element on the screen. Moving away from the center of the screen, the various axes represent various different associations with the content at the center, with the proximity to the center, and therefore, relative size of the elements, representing relevance. The outer bounds of the screen will contain a large amount of varied material of various types to allow the user to select content of many different types, with the content at the periphery of the screen being essentially random and representing little or no link to the rest of the content surrounding it. In this way, the content displayed on the screen will represent a full gamut of possible content that may be accessed by the user.

As a user moves a cursor (via an input device) over the elements, the elements may expand in size, making it easier to see what the content is. A user highlights an element of interest by merely moving the cursor over the element and pausing. Highlighted elements are visually expanded to reveal additional information about the element without further action on the behalf of the user. Elements nearby the highlighted element may also be partially expanded. The enlarged viewing areas for the selected and nearby elements allow the user to easily see what the graphical element represents and read the information associated with these elements. Information associated with the expanded elements may include text such as a title of the content, labels, advertisements, media, graphics, animation, listing of available content sources and video, or combinations thereof. When the highlighted element is selected for further searching, such as by clicking on a "search" button on the remote, it is set to the center of the screen, and is re-surrounded by related content based on the associated information.

Navigation through the user interface of the present disclosure is facilitated by a mechanism to move quickly, simply and accurately across the screen. In one embodiment, an input device such as a motion sensing remote controller is provided. In another embodiment, a touch screen remote device is employed having the cursor on a screen essentially tracking the user's finger as they move it across the remote controller's screen. As the user passes over content, the title graphics would expand, making them easier to read and, as an additional option (possibly at the user's discretion) may show additional data as the user traverses content. Other types of input devices such as conventional remotes, wireless devices such as phones and PDAs, motion capture devices or the like are also considered within the scope of the present disclosure.

Conventional search mechanisms provide an interface to enter text as search criteria and return a list of results. This requires a keyboard for input and does not provide the capability to visually cross reference and link material based on a range of criteria. By way of contrast, the search method and user interface of the present disclosure is graphical, requires no textual input, and therefore a significant amount of data is displayed on the screen at once. Whereas a traditional search requires the user to have some idea of what they are looking for up front, the search method of the present disclosure doesn't pre-suppose this, and allows a very free process of content association to allow the user to find exactly what the user is looking for, even if the user didn't know what it was when the user started.

Initially, systems for delivering various types of content to a user will be described. Subsequently, a method and user interface for searching the content in accordance with embodiments of the present disclosure will then be detailed.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, cable broadcast or from an external network via IP. The locally delivered content is provided to a user's set top box/digital video recorder (DVR) 108 in a user's home, where the content will subsequently be included in the body of available content that may be searched by the user.

A second form of content is referred to as special content. Special content may include content delivered as premium viewing, pay-per-view, or other content otherwise not provided to the broadcast affiliate manager. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system, or explicitly into the search only such that content may be searched that has not yet been delivered to the user's set top box/digital video recorder 108. The content manager 110 may deliver the content to the user's set top box/digital video recorder 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the Internet via delivery network 2 (112) without necessarily having the content managed by the content manager 110. In addition, the scope of the search goes beyond available content to content that may be broadcast or made available in the future.

The set top box/digital video recorder 108 may receive different types of content from one or both of delivery network 1 and delivery network 2. The set top box/digital video recorder 108 processes the content, and provides a separation of the content based on user preferences and commands. The set top box/digital video recorder may also include a storage device, such as a hard drive or optical disk drive, for recording and playing back audio and video content. Further details of the operation of the set top box/digital video recorder 108 and features associated with playing back stored content will be described below in relation to FIG. 2. The processed content is provided to a display device 114. The display device 114 may be a conventional 2-D type display or may alternatively be an advanced 3-D display. It should be appreciated that other devices having display capabilities such as wireless phones, PDAs, computers, gaming platforms, remote controls, multi-media players, or the like, may employ the teachings of the present disclosure and are considered within the scope of the present disclosure.

Figure 2:
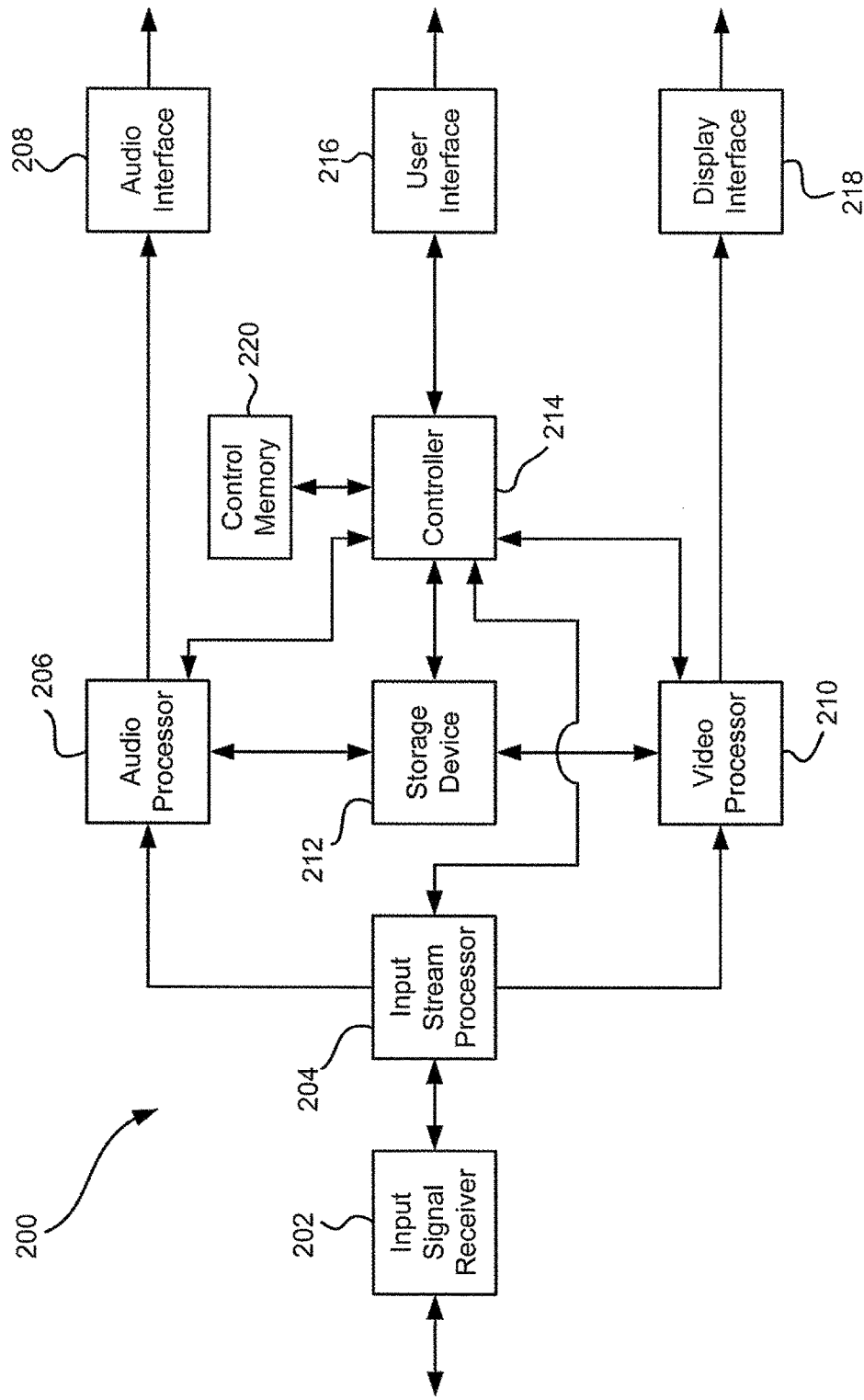
FIG. 2 is a block diagram of an exemplary set-top box/digital video recorder (DVR) in accordance with the present disclosure.

Turning now to FIG. 2, a block diagram of an embodiment of the core of a set top box/digital video recorder 200 is shown. The device 200 shown may also be incorporated into other systems including the display device 114 itself. In either case, several components necessary for complete operation of the system are not shown in the interest of conciseness, as they are well known to those skilled in the art.

In the device 200 shown in FIG. 2, the content is received in an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 202 based on user input provided through a control interface (not shown). The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static random access memory, or dynamic random access memory, or may be an interchangeable optical disk storage system such as a compact disk drive or digital video disk drive. In one embodiment, the storage device 212 may be external and not be present in the system.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as high definition multimedia interface (HDMI). It is to be appreciated that the display interface 218 will generate the various screens for presenting the search results in a three dimensional array as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content, either stored or to be delivered via the delivery networks described above. The controller 214 is further coupled to control memory 220 (e.g., volatile or non-volatile memory, including random access memory, static RAM, dynamic RAM, read only memory, programmable ROM, flash memory, EPROM, EEPROM, etc.) for storing information and instruction code for controller 214. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

To operate effectively, the user interface 216 of the present disclosure employs an input device that moves a cursor around the display, which in turn causes the content to enlarge as the cursor passes over it. In one embodiment, the input device is a remote controller, with a form of motion detection, such as a gyroscope or accelerometer, which allows the user to move a cursor freely about a screen or display. In another embodiment, the input device is a controller in the form of touch pad or touch sensitive device that will track the user's movement on the pad, on the screen. In another embodiment, the input device could be a traditional remote control with direction buttons.

Figure 3:
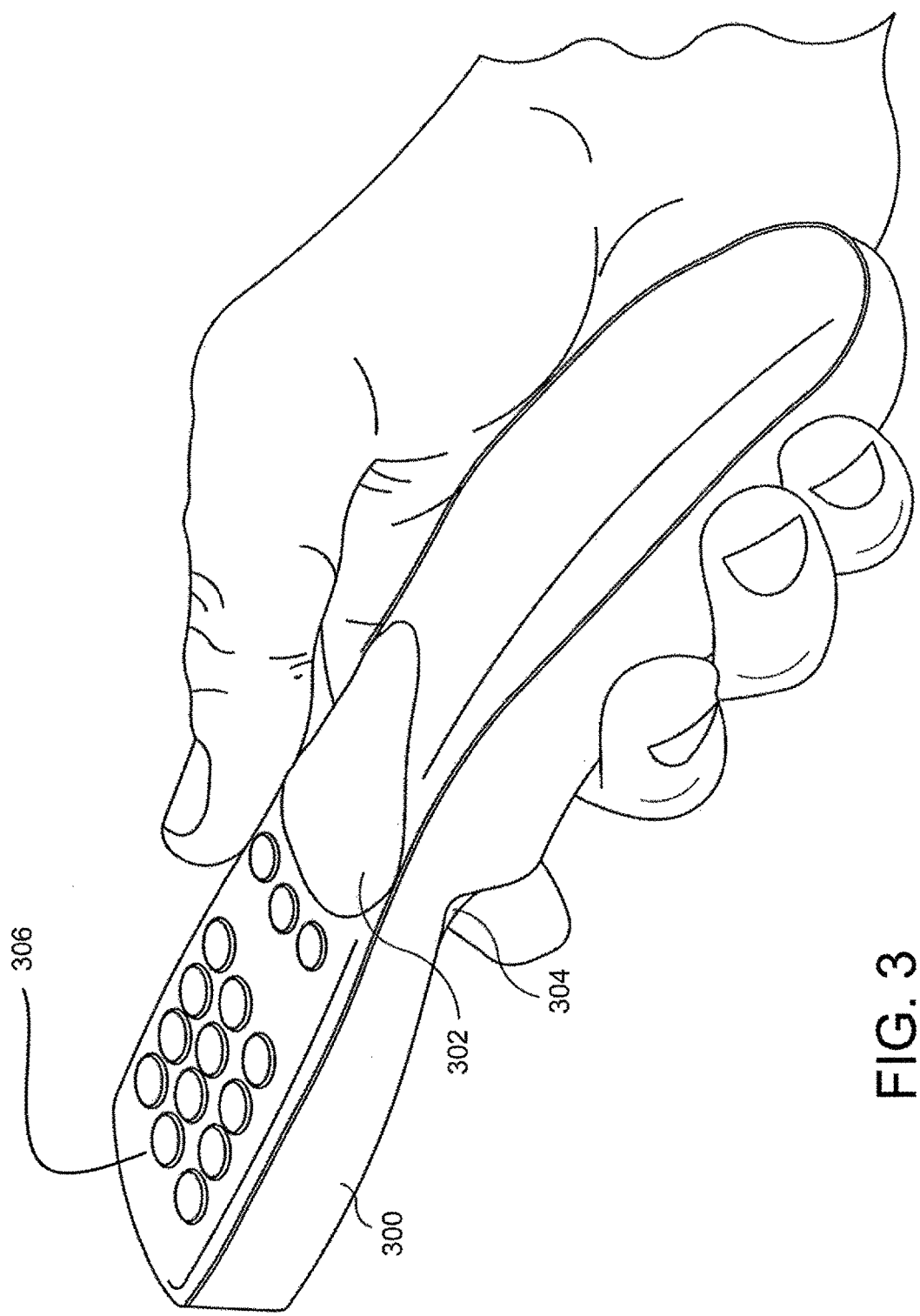
FIG. 3 is a perspective view of an exemplary remote controller in accordance with an embodiment of the present disclosure.

An exemplary hand-held angle-sensing remote controller 300 is illustrated in FIG. 3. Remote controller 300 includes a thumb button 302, positioned on the top side of controller 300 so as to be selectively activated by a user's thumb. Activation of thumb button 302 will also be referred to as a "click," a command often associated with activation or launch of a selected function. Controller 300 further includes a trigger button 304, positioned on the bottom side of controller 300 so as to be selectively activated by a user's index (or "trigger") finger. Activation of trigger button 304 will also be referred to as a "trigger," and angular movement (i.e. pitch, yaw and/or roll) of the controller 300 while the trigger is depressed will be referred to as a "trigger-drag." A trigger-drag command is often associated with movement of a cursor, virtual cursor or other indication of the user's interactive position on the display, such as a change of state (i.e., a highlighted or outlined cell), and is commonly used to navigate in and select entries from the interactive display. Additionally, a plurality of buttons 306 are provided for entering numbers and/or letters. In one embodiment, the plurality of buttons 306 are configured similar to a telephone-type keypad.

The use of a hand-held angle-sensing remote controller provides for a number of types of user interaction. When using an angle-sensing controller, changes in yaw map to left-and-right motions, changes in pitch map to up-and-down motions and changes in roll map to rotational motions along a longitudinal axis of the controller. These inputs are used to define gestures and the gestures, in turn, define specific contextual commands. As such, a combination of yaw and pitch can be used to define any 2-dimensional motion, such as a diagonal, and a combination of yaw, pitch and roll can be used to define any 3-dimensional motion.

In addition to traditional controls for video playback, the remote controller device 300 will include a mechanism to invoke at least three separate options on any element highlighted on the display or screen. These options will be referred to as "Additional Information", "Play" and "Additional Search". The "Additional Information", function is used to display more information about the currently highlighted or selected element. The "Play" function, assuming it is available for the highlighted or selected element, will select that element to be played, which may require a secondary user interface for content purchase, etc. The "Additional Search" function represents the mechanism that allows a user to use any element as a source for an additional advanced search that will generate a whole new content set, updating the entire screen based on criteria defined by the selected element. When the screen is re-drawn, the previously selected element will be placed at the center of the screen, surrounded by a new set of elements representing related content. It is to be appreciated that these three options may be associated with predefined or new gestures or each option may be assigned to a predetermined button of the plurality of buttons 306 on the remote controller 300.

It is to be appreciated that at least some of the components described above in relation to FIGS. 1-3 will form a system for generating the user interface. An exemplary system for searching for content includes the display interface 218 for displaying a plurality of first visual elements in an array on a display device 114, each first visual element corresponding to a selectable content source or category of content; the user interface 216 for selecting, in response to input from an input device 300, at least one of the first visual elements, and a controller 214 for performing a search based on metadata relating to the content source or category of content based on the selection of at least one highlighted first visual element, wherein the display interface 218 displays results of the search as a plurality of second visual elements in three dimensional array on the display 114.

Figure 4:
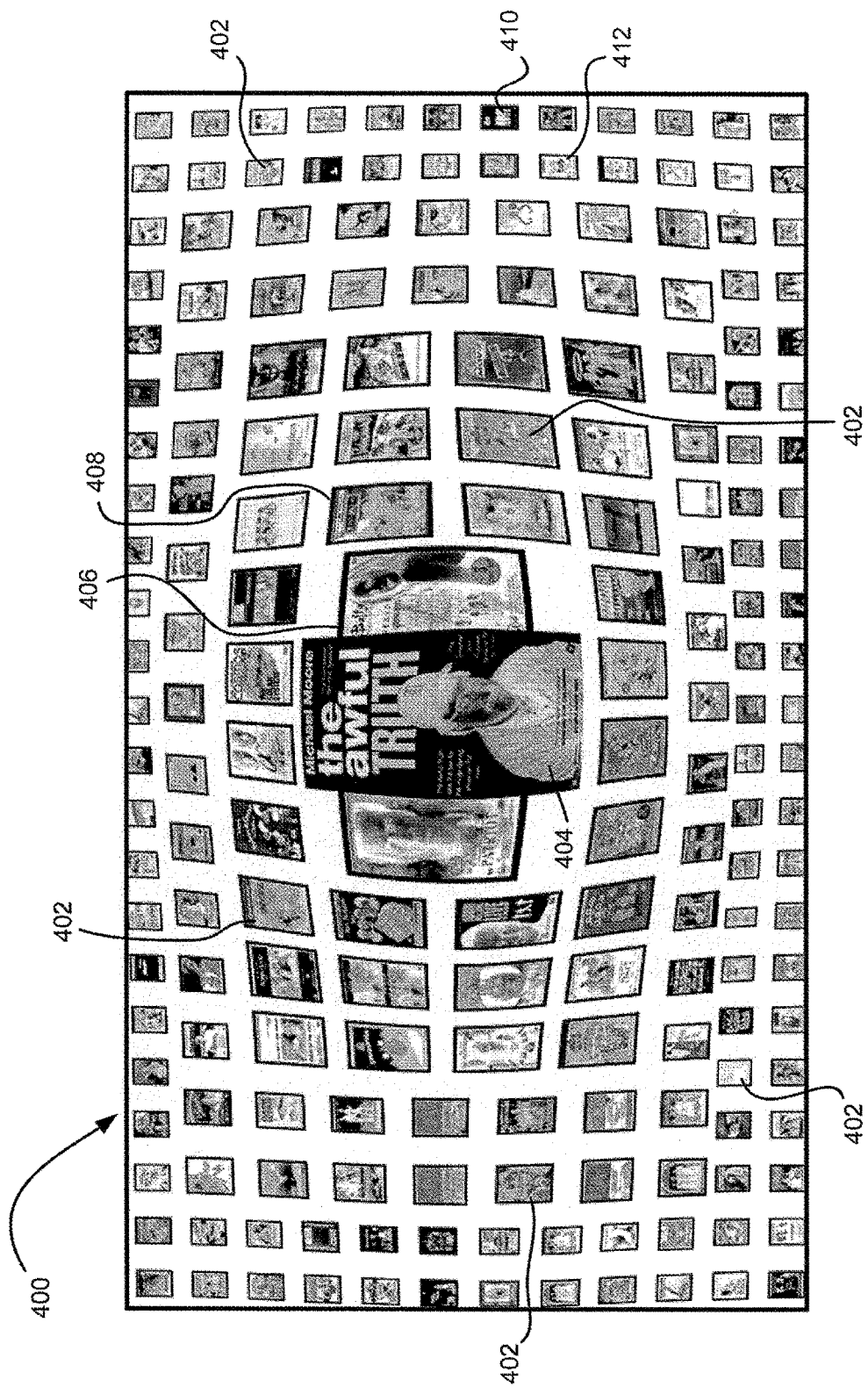
FIG. 4 illustrates an exemplary embodiment of a user interface of the present disclosure.

FIG. 4 illustrates a user interface 400 in accordance with an embodiment of the present disclosure, where graphic elements representing content are generally indicated by reference numeral 402. Interface 400 provides a mechanism for a user to browse through content and channels using graphic elements to represent the content. Instead of traditional search result pages containing five to ten lines of programs, interface 400 presents plurality (e.g., hundreds) of individual elements 402, each potentially having unique visual, spatial, and behavioral attributes representing available programming, channels, applications, music files, or some form of category thereof.

Elements 402 can be of minimal size to allow a maximum number of elements 402 to populate interface 400. In one embodiment, displayed elements 402 rely on a clear graphical element to represent content and content categories, ensuring a maximum number of elements 402 that could be displayed on one screen or display. Accordingly, moving the cursor over the individual elements magnifies them (as shown in 404), and if the user pauses over a particular element for a short period of time, for example, ½ second, additional information may be shown such as a title, actors performing in the content, the director, listing of available content sources, etc.

All elements 402 are of similar proportions, however, elements 402 are visually differentiated through their size and position relative to the central element 404 and graphical representations, elements or signifying symbols in order to help a user identify a particular category of content or particular title of interest. Elements 406, 408 near the center of the screen are larger and have a greater association with content at the center of the screen, e.g., element 404, than those towards the edges of the screen, where the content displayed will be increasingly more random and have significantly smaller elements, e.g., elements 410, 412. This serves two purposes: first, it makes it simple for a user to find content related to the user's search, and second, the increasing randomness provides a mechanism to represent a tremendous variety of content that the user may not otherwise have considered viewing.

The design layout of the elements on the screen will imply depth, with the largest element in the center of the screen, e.g., element 404 in FIG. 4, and elements closer to the periphery of the screen getting smaller and appearing further away, e.g., elements 410, 412. The spacing between elements when moving towards the periphery will also be reduced to also indicate depth. When the user moves the cursor over an element, it is enhanced. In displaying content elements, it is possible that the image of one element will obscure that of another, in particular when the user expands an element by moving over it. For example, in FIG. 4, when expanded element 404 obscures or partially overlaps element 406.

Elements 402 may represent an individual piece of content, such as a movie, which, if selected with a "play" action, will initiate the action to play. In this instance, the element may be, for example a representation of the DVD cover of the title in question. The same element, if selected in a different way, such as with a search button on the remote controller 300 as opposed to a play button, would perform an entirely different action, using the data associated with it as the source for a search for related content. The data used in the search could include a variety of criteria including the content's genre, actors, directors, or other data such as "friends recommendations", etc. The elements may also be used to represent applications, TV channels or other content, though in this case they are not likely to be a recognizable DVD cover, but rather something more directly associated with the content.

Any element may be made up of images representing the content, such as a defined frame from a piece of recorded content, an image supplied from the network or by the user, or from a library of generic elements either manually or automatically assigned to the content. Any of these elements may be augmented with text, either overlaid on the element itself or displayed along with it, and/or additional smaller elements to indicate the type of content. For example, elements representing content that is locally stored on the device 108, 200 may be presented with a small element of a disk drive in the bottom right hand corner of a larger image representing the content itself.

Elements 402 are configured to be detailed enough for a user to clearly see the type of content they represent. Elements 402 could also be in part or fully dynamically created, such as including elements of content currently playing on a broadcast channel. For example, an element may be dynamically generated (either locally or delivered from the network) of a scene from recently broadcast video, then combined with a logo or some indication of the channel on which it currently being broadcast. This would allow a user to see at a glance, what is on currently on a large number of channels at once.

Figure 6:
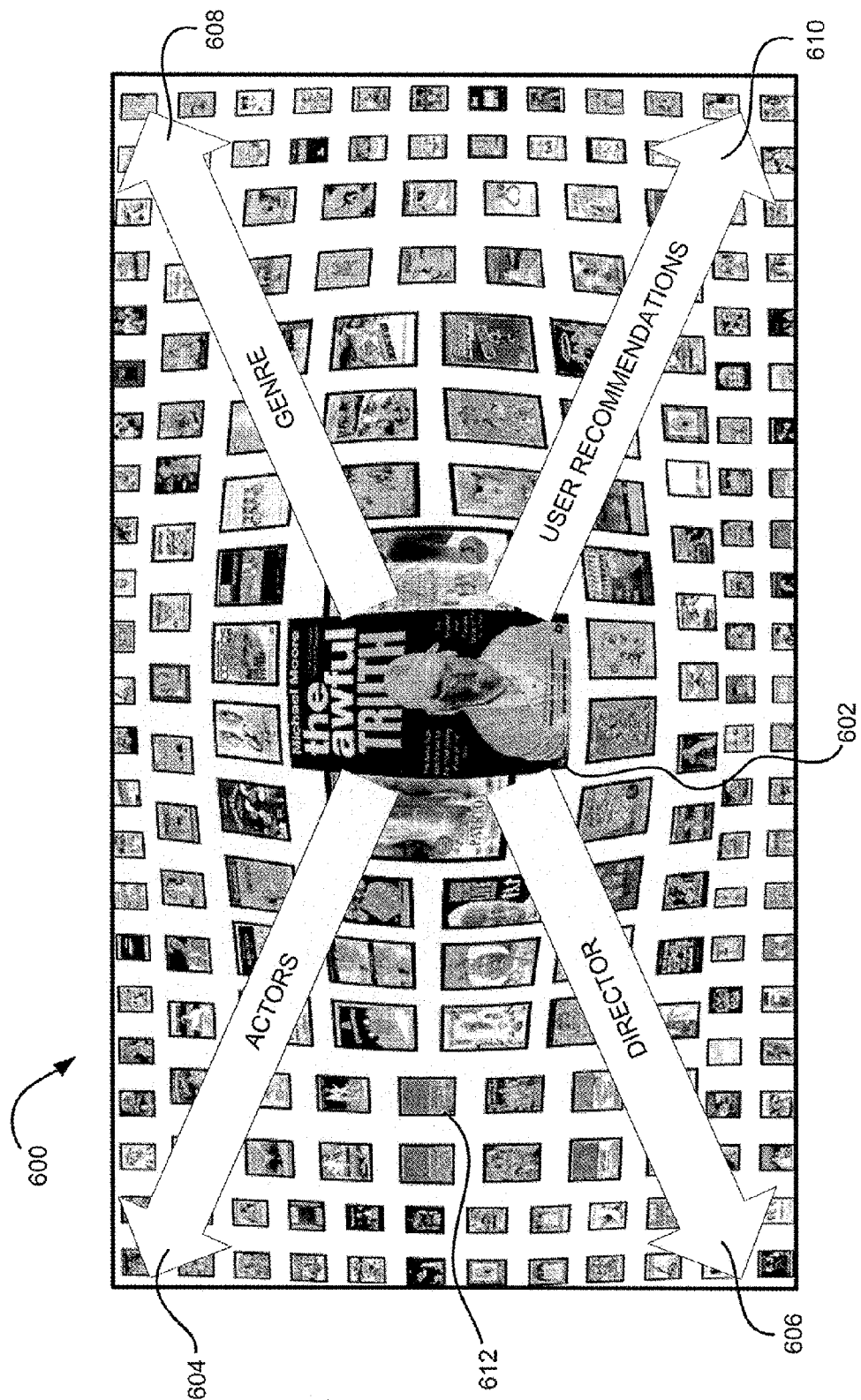
FIG. 6 illustrates how various axes of the user interface represents search criteria relating to a central starting point of the content search.
Figure 7:
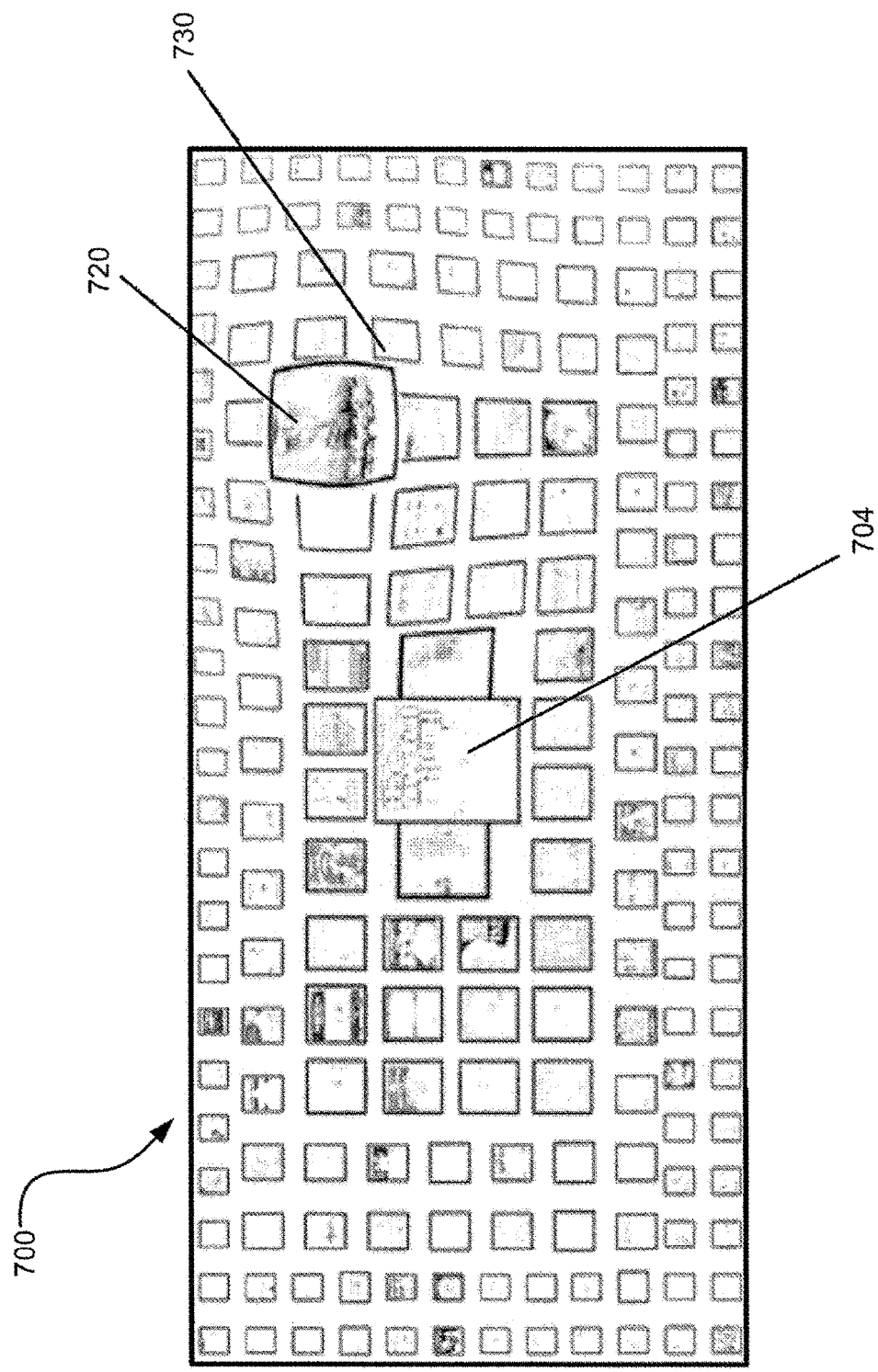
FIG. 7 illustrates a method for determining additional information associated with a selected graphical element and for further searching using the selected element.
Figure 8:
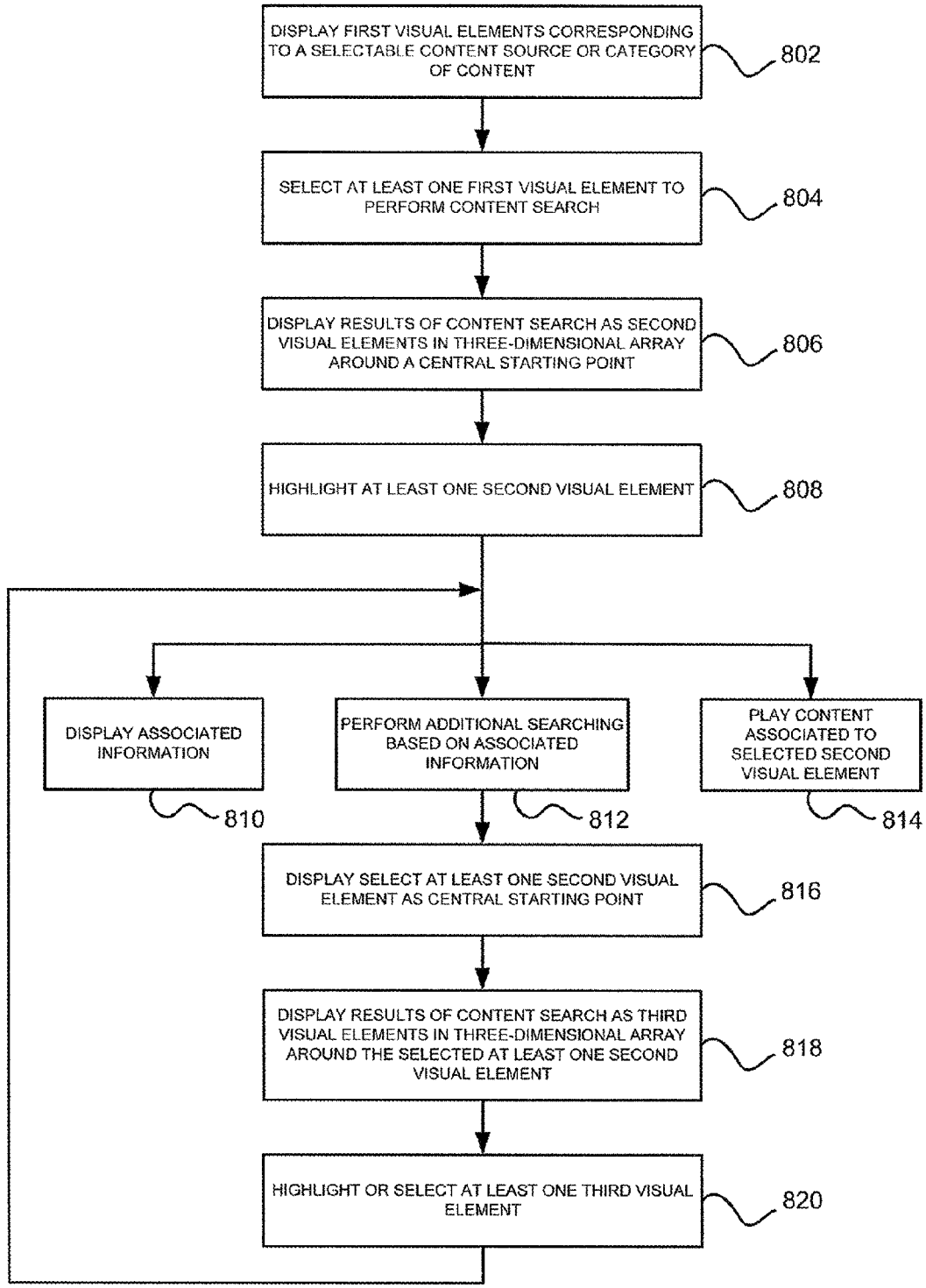
FIG. 8 is a flowchart of an exemplary method for searching for content in accordance with an embodiment of the present disclosure.

A method for searching content using a user interface in accordance with the present disclosure will now be described in relation to FIGS. 5 through 8, where FIGS. 5A, 5B, 6 and 7 illustrate exemplary screens or display of the user interface and FIG. 8 is a flowchart of an exemplary method for searching for content.

Figure 5B:
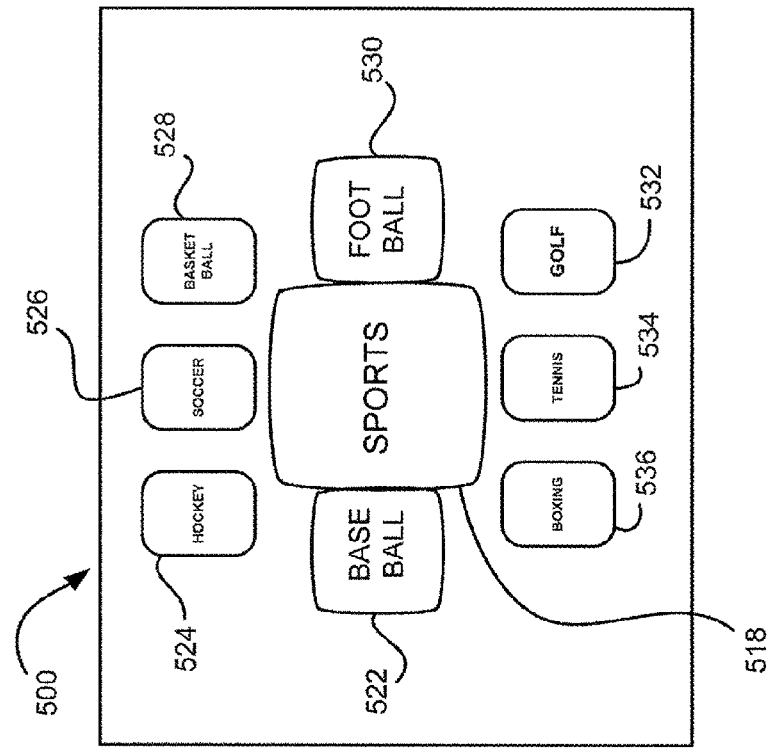
FIGS. 5A and 5B illustrate exemplary initial search screens of the user interface of the present disclosure.
Figure 5A:
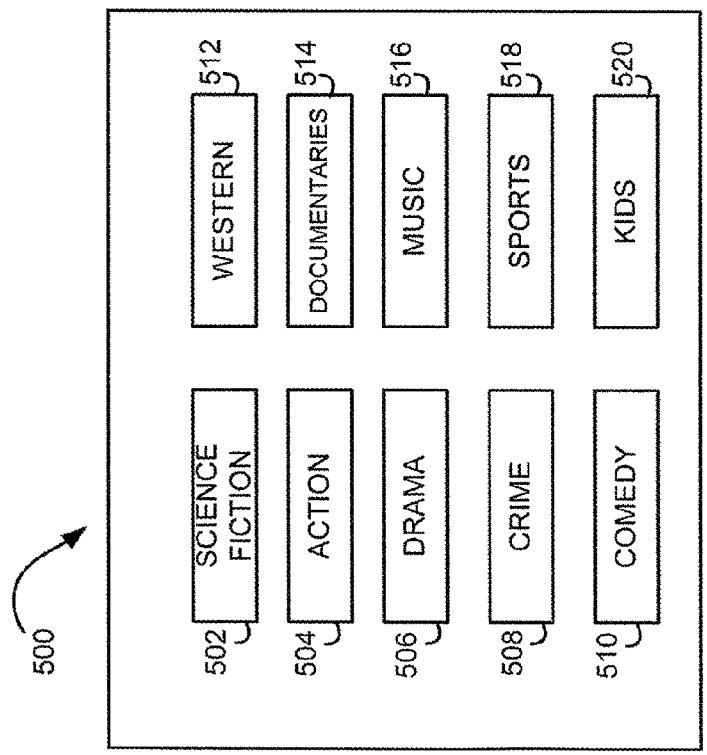

Referring to FIGS. 5A, 5B and 8, an initial screen 500 with a number of first elements that in essence represent, by association, all content that needs to be accessible to the user is provided to a user upon the user beginning to search (step 802). In one embodiment, the key broad categories take up the middle of the screen providing very recognizable and easy to select elements to provide the first, broad-brush search, e.g., categories or sources of content. In this instance, many of the elements would be generic, representing specific genres. For example, there may be a specific element for specific genres such as science fiction 502, action movies 504, drama 506, crime 508, comedy 510, westerns 512, music 516, sport 518, kids 520, etc. and, when selected, will have a title of appropriate genre placed at the centre of the screen, and a next level of detail of generic thumbnails displayed at the edge of the screen. For example, for the first level, the user may select the generic Sport element 518 in FIG. 5A. The second level, shown in FIG. 5B, then displays the selected element 518 at the center of the display 500 and displays a generic thumbnail or element for various types of sport movies such as baseball movies 522, hockey movies 524, soccer movies 526, basketball movies 528, football movies 530, golf movies 532, tennis movies 534 and boxing movies 536.

In one embodiment, the initial screen may be as represented in FIG. 4, where instead of particular titles being predominant, the center of the screen is predominantly populated with thumbnails or elements clearly representing generic categories. In this embodiment, the visual elements include both elements relating to specific content and to a variety of categories. The positioning of the elements in this embodiment may be based on user preferences, e.g., user selected preferences, preferences determined by the controller based on prior viewed selections, etc. In this embodiment, the user may select particular content to be played or executed directly from the initial screen, much as it can be with subsequent screens, or display without performing further searching.

In addition, other different kinds of categories may also be represented such as "Most Popular", or "Top 10". Content may also be represented based on source, such as "TV", "Online" "Local", "Podcasts", etc. In one embodiment, there will be several "start again" thumbnails, elements or a button on the remote which may allow the user to do a random selection based on profile, random selection ignoring profile, etc. The actual implementation may be based on the service being delivered, user preference, user profiling or combination thereof.

The layout of the initial screen 500 could be based on a number of factors including preferences, random selection, previous buying habits or buying profile. In one embodiment, the content in the middle of the initial screen will tend to be type of content the user has watched in the past. The initial screen is to represent, as much as possible, all possible content choices available to the user, which could also imply that a large amount of high-level categories may be displayed. In one embodiment, this could be as broad as elements representing "Broadcast" content, "Movies", "Documentaries", "Applications" and "Games". In this embodiment, these broad categories could also have other elements interspersed that may be, for example, current particularly popular movies, the user's favorite channels, or generic elements representing movie genres such as "Sci-fi". Elements may also be generated for external streaming services such as Youtube, for individual pieces of content on those servers or for content locally available on the device or local network, such as pre-recorded content, allowing any of these services to be searched explicitly.

In one embodiment, a separate initial search screen may be generated for broadcast channels, effectively replacing the traditional electronic program guide (EPG). In another embodiment, the live TV elements may be integrated with other elements on the initial main screen. In another embodiment, the option for the initial screen may be selected as a preference, either during the search or prior allowing users to, for example, include or exclude live TV (or particular channels) from the search. As such, a preference may be provided to, for example, include only "Favorite" channels in the search. In another embodiment, separate "Initial" screens may be created for particular types of content such that there is a separate entry point for Live TV, Movies, Games, etc, or they may be variously merged together in some fashion.

The inherent design of the user interface means that there does not need to be any hierarchy of categories and elements representing very broad categories could be displayed alongside elements representing a specific movie, for example. For the broad categories, no "Play" option will be available, though apart from that, the search option will just use the associated data with the elements to get to a next screen, independently of whether the element represents an explicit piece of content or broad category. Regardless, a search action, by selecting at least one element from the initial screen, will take the user to a new screen where they are more likely to see something closer to what they would like to watch (step 804).

Once the user has selected a content source or category (step 804) for search, the user will be presented the results of the search as a plurality of second visual elements in a three dimensional array on the display 600, as shown in FIGS. 4 and 6 (step 806). Each visual element on the secondary screen may still correspond to generic categories (as determined by the search), or, more frequently to a specific piece of content, wherein at least one axis of the display 600 represents search criteria relating to a central starting point 602 of the three dimensional array and proximity of each of the second visual elements to the central starting point indicates a degree of relevance to the search.

Referring to FIG. 6, the axes 604-610 on the screen may all be used to represent categories of association with the content represented by the element at the center of the screen 602. These axes may vary according to implementation and there may be more than just diagonal axes defined. In one embodiment, the axes could represent, actors along a first diagonal (to top left) 604, directors down a second diagonal (to bottom left) 606, genre up a third diagonal (to top right) 608, and "people that like this content also liked . . . " down a forth diagonal (to bottom right) 610. For example, as a user moves the cursor, in response to movement of the input device, the cursor will highlight, e.g., expand, various elements. As the cursor moves along axis 604, the user interface will display elements of content that either have the same actors as in the content represented by the central element 602 or will display elements of content that have some relationship or association to the actor in the content represented by the central element 602. As a further example, if the user moves the cursor over content elements, e.g., element 612, between axis 604 and axis 606, the user interface will display elements of content that share an association to actors appearing in and the director of the content represented by the central element 602. In another embodiment, content with multiple genres may use multiple axes to represent each genre separately.

Referring to FIGS. 7 and 8, in step 808, in a typical embodiment, when a user highlights one of elements presented in the search results by using a pointing device such as a the hand-held remote controller 300 described above. When the user moves over an element, the element is expanded in-situ, as illustrated by highlighted element 720. More specifically, the display area associated with highlighted element 720 is also enlarged and additional content associated with highlighted element 720 is displayed to provide the user with more information about the highlighted or selected source. Elements proximate to selected element 720 are also visually expanded to a lesser extent as illustrated by proximate elements 730, such that proximate elements 730 closest to selected element 720 are largest in size, but smaller than element 720. The progressive expansion of elements proximate to selected element 720 may be referred to as "hyperbolic expansion". In one embodiment, progressive expansion is vertically and horizontally, but in other embodiments may be only horizontal or vertical. It may also include, as an example, a type of lens distortion effect as if the element 720 is being placed under a magnifying glass. Individual elements may be highlighted by moving the cursor in both horizontal (x) and vertical (y) dimensions or any degree of either of these dimensions.

Once an element is highlighted, e.g., element 720, it may be selected for further action by clicking on an action button on the remote controller 300 or by performing an appropriate gesture with the remote controller 300. In one embodiment, there are at least three main actions: to display information associated to the content (step 810); to search again using data from the highlighted element 720 as a search key (step 812), or to go directly to play or execute that piece of content associated to the highlighted or selected element (step 814). Other embodiments may also include options such as to play or purchase the content, get additional information, source selection, add it to a favorites, etc.

When the option to display associated information is selected (step 810), the user interface will provide additional information regarding the highlighted content. This information associated with the expanded elements may include text (such as a title of the content, actors appearing in, the director, etc.), labels, listing of available content sources, advertisements, media, graphics, animation, applications, links and video, or combinations thereof. Portions of this additional information may also be configured to be displayed as the cursor passes over the content, and a different set may also be displayed as the element is highlighted.

When functions such as 'play' or 'tune to' are invoked (step 814), the action will take place immediately in association with the current enlarged focus element 720. For more complex or multi-step functions such as record, remind, rate this, and block/restrict, subsequent user actions are required. These subsequent user actions are facilitated by menus or step-through interactive sequences. These menus or step-through interactive sequences may appear as pop-up or floating panels, with a variety of text instructions, questions, or choices, and active elements representing selectable options.

The user may also select the option to perform further searching based on the highlighted or selected element (step 812). To perform the further searching, the information associated to the selected content element will be employed for the search criteria. Once the results of the search are determined, the display or screen will be re-drawn with the selected element as the central starting point (step 816). The user interface will then display the results of the search as a plurality of third visual elements in a three dimensional array on the display surrounding the previously selected element (step 818). In step 820, the user may then select or highlight one of the displayed elements and the user will then have the option to perform at least one of the actions described above in steps 810, 812 and 814.

When the user selects a new element to perform further searching, the relative position of the element may be taken into account in building the next screen, such that the next screen may place a greater emphasis on the axis of selection. In this instance, the content selected for subsequent screens would have much more weight put on the relationships defined by the axis in which the element primarily resided than it would normally. In another embodiment, in the instance of a more sophisticated remote control being available, an additional option may be made available such that the user has more control over the process of search, defining the key criteria on which to search. As an example, the user may be presented with a "Search by Genre" or "Search by Actor" button, such that regardless of the position of the element on the screen, the user may select the criteria upon which to weight their search.

In another embodiment, multiple elements may be selected at once to give a more precise search. For example, a comedy element may be selected from the genre axis, while another film may be selected from the "Actor" axis, with the resulting search showing content oriented to comedy with associations to the selected actor. Axes may be labeled subtly or overtly or changed dynamically to facilitate any desired type of search.

In another embodiment, the user interface for the search may be presented on an external device such as a tablet and not on the display device 108 itself. In this embodiment, user input would be directly through touching the screen of the tablet, and actions performed could either result in content being displayed on the tablet itself, or on an associated display device.

The search method and user interface of the present disclosure could apply to content in all forms such as applications, games, music, video, books, or any other content that may be represented in a graphic form with associated text.

Each of these types of content could be presented with their own separate screens or all integrated into the one screen consolidating all forms of content. In this instance, where the user interface is presenting multiple types of content on the one screen, an additional element may be overlaid over some or all content elements indicating the type of content it represents (i.e. book, application, video, music, etc). This could, in one embodiment, take the form of a small marker at the bottom right hand corner of each content element image. In another embodiment, the type of the content may be displayed in the information screens associated with the content elements rather than over the elements themselves, becoming visible as the user moves the cursor over the content.

Furthermore, the present disclosure provides a mechanism for weighting the results that match a search to determine what content is displayed and where. This weighting will provide for a wide variety of inputs including automated preference discovery, usage habits, friend or trusted recommendations, and general popularity, in addition, the degree too which the content matches the search. The searches are performed against multiple criteria at once, with the search results then weighted according to how many matches were found with the data from the data from the search key. For example, a title that shares some of the same actors as the selected title will be considered in the results. If it has additional matches, such as Genre, then it may be placed between the Genre and Actor axis and if it is also a popular piece of content, then it is likely to be placed close to the center of the screen after the search. In addition, the rating of responses can be measured in a number of different ways. For example, if actors are matched in a resultant search, that content which shares multiple actors will be given high precedence, as will content that shares the primary or lead actors, rather than less significant actors.

As an example of one implementation of the user interface, consider a user thinking of watching a rock documentary, and ending up watching "The Princess Bride". In this example, the initial screen may contain some form of Rock documentary or music video element. Selecting this will take it to the center of a new screen, and nearby in the Genre section could be "This is Spinal Tap", a Rob Riener film. Thinking "This is Spinal Tap" might be more entertaining than a standard rock documentary, the user may do an additional search on "This is Spinal Tap", to generate a new screen, where, given "This is Spinal Tap" and "The Princess Bride" are both popular films classified in the comedy genre and directed by Rob Riener, "The Princess Bride" will be close to the center of the screen and easily visible, therefore catching the attention of the user.

The present disclosure will also provide a user interface to allow selection and prioritization, inclusion or exclusion of certain content. For example, the user may define that they have little interest in Westerns, and therefore, Westerns will rarely appear unless extremely popular and/or are very strongly related to the core content. If they do appear, their "relevance" and therefore position on the screen will be tempered by the user's stated lack of interest, and the content will therefore appear further from the center of the screen than would otherwise be the case.

Although embodiments which incorporate the teachings of the present disclosure have been shown and described in detail herein, those skilled in the art can readily devise many other varied embodiments that still incorporate these teachings. Having described preferred embodiments of a system, method and user interface for content search (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for searching for content on an interactive graphic display in response to an input device, the method comprising:
    outputting for display a plurality of first visual elements in a three-dimensional arrangement on the display, each first visual element corresponding to a selectable content source or category of content;
    selecting at least one of the first visual elements;
    performing a search of the selectable content source or category of content using a set of search criteria based on at least one of information associated with the selected first visual element and the relative position of the selected first visual element in the three-dimensional arrangement; and
    outputting for display results of the search as a plurality of second visual elements in a new three-dimensional arrangement on the display with a central element in the new three-dimensional arrangement being the selected first visual element, each second visual element corresponding to specific content or content category, the new three-dimensional arrangement including at least a first axis of direction beginning from the central element and extending in a direction away from the central element, wherein the second visual elements arranged along the at least one first axis of direction in the new three-dimensional arrangement represent the results of at least one first criteria of the set of search criteria relating to the central element of the new three-dimensional arrangement, and proximity of each of the second visual elements to the central element indicates a degree of relevance of each of the second visual elements to the central element based on the search, wherein a size of each of the second visual elements increases as the proximity of each of the second visual elements to the central element increases.

2. The method as in claim 1, further comprising:
    highlighting at least one second visual element in response to input from the input device; and
    adjusting an appearance of the highlighted at least one second visual element to reveal information of the specific content associated to the selected at least one second visual element.

3. The method as in claim 2, further comprising displaying additional information of the specific content associated to the selected at least one second visual element.

4. The method as in claim 3, further comprising:
    performing an updated content search, in response to input from the input device, based on the additional information of the specific content associated to the selected at least one second visual element;
    outputting for display the selected at least one second visual element as the central starting element; and
    outputting for display the results of the updated content search based on the additional information of the specific content associated to the selected at least one second visual element as a plurality of third visual elements in another new three-dimensional arrangement on the display, each third visual element corresponding to a specific piece of content or content category.

5. The method as in claim 2, further comprising adjusting an appearance of the second visual elements surrounding the highlighted at least one second visual element to reveal information of the specific content associated to each of the surrounding second visual elements.

6. The method as in claim 2, further comprising executing the specific content associated to the selected at least one second visual element in response to input from the input device.

7. The method as in claim 1, further comprising:
    highlighting at least one second visual element in response to input from the input device; and
    adjusting an appearance of the highlighted at least one second visual element and surrounding second visual elements in a hyperbolic expansion to reveal information of the specific content associated to the highlighted at least one second visual element and the surrounding second visual elements without adjusting the relative positions of the second visual elements in the three-dimensional arrangement.

8. The method as in claim 1, further comprising:
    selecting at least two second visual elements in response to input from the input device;
    performing an updated content search, in response to input from the input device, based on additional information of the specific content associated to the selected at least two second visual elements; and
    outputting for display the results of the updated content search as a plurality of third visual elements in another new three-dimensional arrangement on the display, each third visual element corresponding to a specific content or content category.

9. The method as in claim 1, wherein the selectable content source includes video channels, video titles, music or applications.

10. The method as in claim 1, wherein the at least one first axis of direction represents genres, actors, directors or ratings regarding other content from other users.

11. The method as in claim 1, wherein at least one of the first and second visual elements indicates a type of the specific content.

12. The method as in claim 1, wherein at least one of the first and second visual elements indicates a source of the specific content.

13. The method as in claim 1, wherein at least one of the first and second visual elements is dynamically created from the specific content.

14. The method as in claim 1, wherein the plurality of first visual elements further includes at least one visual element corresponding to specific content, the method further comprising executing the specific content from the displayed plurality of first visual elements in response to input from the input device.

15. The method as in claim 14, wherein the plurality of first visual elements is displayed in another new three-dimensional arrangement on the display, the central starting element of the another new three-dimensional arrangement of the plurality of first visual elements is based on user preference and proximity of each of the first visual elements to the central starting element indicates a degree of relevance to the central starting element.

16. An apparatus comprising:
a display interface that outputs for display a plurality of first visual elements in a three-dimensional arrangement on a display device, each first visual element corresponding to a selectable content source or category of content;
a user interface that selects, in response to input from an input device, at least one of the first visual elements;
a controller, coupled to the display interface and user interface, the controller performing a search of the selectable content source or category of content using a set of search criteria based on at least one of information associated with the selected first visual element and the relative position of the selected first visual element in the three-dimensional arrangement; and
the display interface further outputting for display results of the search as a plurality of second visual elements in a new three-dimensional arrangement on the display with a central element in the new three-dimensional arrangement being the selected first visual element, each second visual element corresponding to a specific content or content category, the new three-dimensional arrangement including at least a first axis of direction beginning from the central element and extending in a direction away from the central element, wherein the second visual elements arranged along the at least one first axis of direction in the new three-dimensional arrangement represent the results of at least one first criteria of the set of search criteria relating to the central element of the new three-dimensional arrangement, and proximity of each of the second visual elements to the central element indicates a degree of relevance of each of the second visual elements to the central element based on the search, wherein a size of each of the second visual elements increases as the proximity of each of the second visual elements to the central element increases.

17. The apparatus as in claim 16, wherein in response to input from the input device selecting at least one second visual element, the display interface adjusts an appearance of the selected at least one second visual element to reveal information of the specific content associated to the selected at least one second visual element.

18. The apparatus as in claim 17, wherein the display interface outputs for display additional information of the specific content associated to the selected at least one second visual element.

19. The apparatus as in claim 18, wherein the controller performs an updated content search, in response to input from the input device, based on the additional information of the specific content associated to the selected at least one second visual element; and
the display interface outputs for display the selected at least one second visual element as the central starting element and displays the results of the updated content search as a plurality of third visual elements in another new three-dimensional arrangement on the display, each third visual element corresponding to a specific content.

20. The apparatus as in claim 17, wherein the display interface adjusts an appearance of the second visual elements surrounding the selected at least one second visual element to reveal information of the specific content associated to each of the surrounding second visual elements.

21. The apparatus as in claim 17, wherein the controller plays the specific content associated to the selected at least one second visual element in response to input from the input device.

22. The apparatus as in claim 16, wherein in response to input from the input device highlighting at least one second visual element, the display interface adjusts an appearance of the highlighted at least one second visual element and surrounding second visual elements in a hyperbolic expansion to reveal information of the specific content associated to the highlighted at least one second visual element and the surrounding second visual elements without adjusting the relative positions of the second visual elements in the three-dimensional arrangement.

23. The apparatus as in claim 16, wherein the input device is a remote device.

24. The apparatus as in claim 16, wherein the input device is a touch screen device.

25. The apparatus as in claim 16, wherein the plurality of first visual elements further includes at least one visual element corresponding to specific content, the controller executes the specific content from the displayed plurality of first visual elements in response to input from the input device.

26. The apparatus as in claim 25, wherein the display interface outputs for display the plurality of first visual elements in another new three-dimensional arrangement on the display, the central starting element of the another new three-dimensional arrangement of the plurality of first visual elements is based on user preference and proximity of each of the first visual elements to the central starting element indicates a degree of relevance to the central starting element.

27. The apparatus as in claim 16, wherein in response to input from the input device selecting at least two second visual elements, the controller performs an updated content search, based on additional information of the specific content associated to the selected at least two second visual elements and the display interface outputs for display the results of the updated content search as a plurality of third visual elements in another new three-dimensional arrangement on the display, each third visual element corresponding to a specific content or content category.

28. The apparatus as in claim 16, wherein the selectable content source includes video channels, video titles, music or applications.

29. The apparatus as in claim 16, wherein the at least one first axis of direction represents genres, actors, directors or ratings regarding other content from other users.

30. The apparatus as in claim 16, wherein at least one of the first and second visual elements indicates a type of the specific content.

31. The apparatus as in claim 16, wherein at least one of the first and second visual elements indicates a source of the specific content.

32. The apparatus as in claim 16, wherein at least one of the first and second visual elements is dynamically created from the specific content.

33. The method as in claim 1, wherein the input device is a remote device.

34. The method as in claim 1, wherein the input device is a touch screen device.

35. The method of claim 1, wherein the new three-dimensional arrangement includes at least one second axis of direction beginning from the central element and extending in a direction away from the central element, the second visual elements arranged along the at least one second axis of direction in the new three-dimensional arrangement represent the results of at least one second criteria of the set of search criteria relating to the central element of the new three-dimensional arrangement and the second visual elements arranged between the at least one first axis of direction and the at least one second axis of direction share an association with the at least one first criteria and the at least one second criteria of the set of search criteria.

36. The apparatus as in claim 16, wherein the new three-dimensional arrangement includes at least one second axis of direction beginning from the central element and extending in a direction away from the central element, the second visual elements arranged along the at least one second axis of direction in the new three-dimensional arrangement represent the results of at least one second criteria of the set of search criteria relating to the central element of the new three-dimensional arrangement and the second visual elements arranged between the at least one first axis of direction and the at least one second axis of direction share an association with the at least one first criteria and the at least one second criteria of the set of search criteria.

37. The method of claim 35, wherein the at least one first axis of direction and the at least one second axis of direction are disposed on a first plane that extends across the display.

38. The apparatus of claim 36, wherein the at least one first axis of direction and the at least one second axis of direction are disposed on a first plane that extends across the display.

39. The method of claim 7, wherein the appearance is adjusted in a hyperbolic expansion in at least one of a horizontal and vertical direction.

40. The method of claim 7, wherein the hyperbolic expansion includes a lens distortion effect of magnification.

41. The apparatus of claim 22, wherein the display interface adjusts the appearance in a hyperbolic expansion in at least one of a horizontal and vertical direction.

42. The apparatus of claim 22, wherein the hyperbolic expansion includes a lens distortion effect of magnification.

* * * * *